US011098826B2

(12) United States Patent  
Williamson

(10) Patent No.: US 11,098,826 B2  
(45) Date of Patent: Aug. 24, 2021

(54) FLANGE ASSEMBLY

(71) Applicant: Trelleborg Westbury Limited, Tewkesbury (GB)

(72) Inventor: Mark Williamson, Westbury (GB)

(73) Assignee: Trelleborg Westbury Limited, Tewkesbury (GB)

( * ) Notice: Subject to any disclaimer, the term of this patent is extended or adjusted under 35 U.S.C. 154(b) by 401 days.

(21) Appl. No.: 16/158,243

(22) Filed: Oct. 11, 2018

(65) Prior Publication Data

US 2019/0113161 A1 Apr. 18, 2019

(30) Foreign Application Priority Data

Oct. 13, 2017 (GB) .................................... 1716781

(51) Int. Cl.
| | |
|---|---|
| *F16L 23/032* | (2006.01) |
| *F16L 23/00* | (2006.01) |
| *F16L 23/02* | (2006.01) |
| *F16L 23/18* | (2006.01) |

(Continued)

(52) U.S. Cl.
CPC ........... *F16L 23/032* (2013.01); *F16L 23/003* (2013.01); *F16L 23/006* (2013.01); *F16L 23/02* (2013.01); *F16L 23/0283* (2013.01); *F16L 23/18* (2013.01); *F16L 37/1205* (2013.01); *F16B 2200/503* (2018.08); *F16B 2200/506* (2018.08); *F16B 2200/509* (2018.08)

(58) Field of Classification Search
CPC ..... F16L 23/032; F16L 23/003; F16L 23/006; F16L 23/0283; F16L 23/036; F16L 23/02; F16L 23/024

USPC ...... 285/27, 28, 29, 414, 412, 405, 406, 920
See application file for complete search history.

(56) References Cited

U.S. PATENT DOCUMENTS 2,825,583 A 3/1958 Lamp
2,891,807 A 6/1959 Auwater
(Continued)

FOREIGN PATENT DOCUMENTS

EP 0 719 82 A2 2/1983
EP 2 122 224 11/2009
(Continued)

OTHER PUBLICATIONS

European Search Report for EP 18275155.2 dated Nov. 17, 2020.

*Primary Examiner* — Aaron M Dunwoody
(74) *Attorney, Agent, or Firm* — Foley & Lardner LLP

(57) ABSTRACT

A flange assembly includes a flange for connection to a hose or pipe, the flange defining a contact face for engagement with a contact face of an opposed flange. The flange assembly also includes at least three clamps spaced circumferentially around the contact face. Each clamp includes a clamp body pivotably secured to the flange and a clamp member mounted on the clamp body, which is movable between a first, retracted position and a second, clamping position. A clamp face of the clamp member faces the contact face of the flange. The clamp member is movable relative to the clamp body to adjust the position of the clamp face relative to the contact face of the flange and adjust a clamping force created between the clamp face and the contact face of the flange to retain an opposing flange in face-to-face engagement with the contact face of the flange.

14 Claims, 8 Drawing Sheets

(51) Int. Cl.
*F16L 37/12* (2006.01)
*F16L 23/028* (2006.01)

(56) References Cited

U.S. PATENT DOCUMENTS

| | | | | |
|---|---|---|---|---|
| 3,642,307 A | * | 2/1972 | Brickhouse | F16L 37/124 |
| | | | | 285/38 |
| 3,865,412 A | | 2/1975 | Ashton | |
| 4,222,591 A | | 9/1980 | Haley | |
| 9,074,713 B2 | * | 7/2015 | Janssen | F16L 37/1205 |

FOREIGN PATENT DOCUMENTS

| | | |
|---|---|---|
| GB | 1 217 781 | 12/1970 |
| GB | 2 496 872 B | 9/2015 |

* cited by examiner

FLANGE ASSEMBLY

CROSS-REFERENCE TO RELATED APPLICATIONS

This application claims the benefit of and priority to Great Britain Patent Application No. 1716781.8, filed Oct. 13, 2017, which is incorporated herein by reference in its entirety.

BACKGROUND

The invention relates to a flange assembly for use in the creation of a connection between a pair of pipes or hoses.

SUMMARY

According to one embodiment of the invention, there is provided a flange assembly including a flange in the form of a disk-shaped rim for connection to a hose or pipe, the flange defining a contact face for engagement, in use, with a contact face of an opposed flange, and at least three clamps spaced circumferentially around the contact face of the flange, each clamp including a clamp body pivotably secured to the flange and a clamp member mounted on the clamp body for movement relative thereto, the clamp body being movable between a first, retracted position and a second, clamping position in which a clamp face of the clamp member faces the contact face of the flange, the clamp member being movable relative to the clamp body to adjust the position of the clamp face relative to the contact face of the flange and thereby adjust a clamping force created between the clamp face and the contact face of the flange.

The provision of clamps coupled to the flange readily allows for opposing flanges to be retained in face to face contact and avoids the need for through-holes to be aligned in order to allow the insertion of bolts to secure the flanges in face to face contact.

The provision of a pivotal connection between the clamp body of each clamp and the flange allowing pivotal movement of the clamp body between the first, retracted position and the second, clamping position, allows the clamp body in use, to be located in the first, retracted position during location of an opposing flange so as to not to obscure or otherwise block the contact face of the flange and thereby allow the opposing flange to be located and properly engaged with the contact face of the flange. Once the opposing flange has been properly located and engaged with the contact face of the flange, the clamp body may be pivoted into the second, clamping position in which the position of the clamping face relative to the clamp face may be adjusted in order to clamp the opposing flange against the contact face of the flange.

Preferably, the clamp member is threadedly engaged through an aperture in the clamp body, the clamp face being movable relative to the contact face of the flange, when the clamp body is located in the second, clamping position, on rotation of the clamp member.

Such an arrangement provides an efficient mechanism that readily allows adjustment of the position of the clamp face relative to the contact face of the flange when required. The use of a threaded engagement between the clamp member and the clamp body effectively locks the clamp face in position, preventing unwanted adjustment of the position of the clamp face, without the need for any additional lock or latching mechanism.

Through the use of an appropriate adaptation of the clamp member, such as the provision of a hexagonal head on the end of the clamp member remote from the clamp face, the position of the clamp face can be readily adjusted through the use of conventional tools such as spanners and/or sockets.

Preferably, so as to avoid the possibility of the clamp body of each clamp being inadvertently moved out of the first, retracted position before location and engagement of an opposing flange with the contact face of the flange, each clamp includes a latching mechanism that is operable to hold the clamp body and prevent free movement thereof when the clamp body is located in the first, retracted position.

More preferably, so as to ensure that the clamp body is also retained in position during adjustment of the clamping force between the clamp face and the contact face of the flange, the latching mechanism is also operable to hold the clamp body and prevent free movement thereof when the clamp body is located in the second, clamping position.

In other embodiments, it is envisaged that the latching mechanism may not be operable when the clamp body is located in the first position and may only be operable to hold the clamp body and prevent free movement thereof when the clamp body is located in the second clamping position.

Pivotal mounting of the clamp body of each clamp on the flange may be achieved by pivotably mounting the clamp body between a pair of opposed pivot blocks, the pivot blocks being secured to an outer circumferential edge of the flange.

In such embodiments, a latching mechanism in the form of a ball catch may be provided on each of two opposing, outer surfaces of each clamp body. Each ball catch includes a spherical latch element captive within an aperture formed in the respective outer surface of the clamp body whilst being biased to protrude from the outer surface of the clamp body for engagement in a correspondingly shaped opening formed in an adjacent surface of the respective pivot block when the clamp body is located in the first, retracted position.

Such an arrangement allows the clamp body to be readily engaged with the latching mechanism on each pivot block as the clamp body is moved into the first, retracted position, and retained in that position until sufficient force is applied to the clamp body in order to depress the spherical latch element against the bias and thereby allow movement of the clamp body to the second, clamping position.

Preferably, the spherical catch element of each ball catch is additionally engageable in a correspondingly shaped opening formed in the adjacent surface of the respective pivot block when the clamp body is located in the second, clamping position.

It will be appreciated that the biasing mechanism selected in order to bias each spherical latch element to protrude from the respective outer surface of the clamp body should be sufficient in size to prevent inadvertent depression of the spherical latch element, and thus inadvertent release of the latching mechanism.

Preferably, the clamp member of each clamp includes a leg having a foot element mounted at an end thereof by means of a ball joint, the foot element defining the clamp face of the clamp member.

The use of a ball joint allows pivoting movement of the foot element relative to the leg on engagement of the clamp face against a rear surface of an opposing flange and thus allows the clamp face to turn on the ball joint in order to maximise contact between the clamp face and the rear surface of the opposing flange. This is particularly advantageous in circumstances where the rear surface of an opposing flange is uneven, which might otherwise reduce the amount of surface area in contact with the clamp face.

In such embodiments, the foot element may be formed from a compressible material to allow such flexure of the foot relative to the leg.

For cryogenic applications, an insulating pad may be provided on the clamp face of each clamp member. Such an arrangement insulates the clamp member from the rear surface of the opposing flange. This, in turn, reduces the flow of heat energy from the clamp member to the rear surface of the opposing flange and thus prevents or at least reduces cooling of the clamping members that might otherwise injure an operator during adjustment of the position of the clamp face relative to the contact face.

In particularly preferred embodiments, the flange assembly may further include at least three guide members circumferentially spaced around the contact face of the flange, each guide member being detachably secured to an outer edge of the flange so as to extend generally perpendicularly relative to the contact face of the flange, and reducing in width so as to define a tapered nose section spaced from the contact face of the flange.

The provision of such guide members provides a mechanism, in use, for guiding the flange and an opposing flange into alignment readily with minimum input from an operator and thereby reducing the risk of injury.

The use of guide members that are detachably secured directly to an outer edge of the flange allows for different arrangements and configurations of the guide members depending on the flange, and thus provides a reconfigurable flange assembly for use with a range of flanges. It is envisaged that the flange assembly could be used with any existing flange or pipe arrangement and the flange member, for example, may be provided in the form of a spool flange, a slip on flange, a weld neck flange or a studded flange.

The clamps and guide members may be alternately arranged and equidistantly spaced, circumferentially, around the contact face of the flange. Such an arrangement ensures a balanced effect is achieved from both the clamps and the guide members.

Preferably, the flange assembly in such embodiments includes a protection ring extending around and detachably secured to outer edges of the guide members.

The use of a detachably secured ring allows the ring to be detached from the flange assembly, together with or separately from the guide members. This increases the modular nature of the flange assembly, again allowing the flange assembly to be reconfigured.

It is envisaged that the flange may include a plurality of connecting bolts protruding from a face of the flange opposite the contact face—i.e. from a rear face of the flange—in order to connect the flange, in use, to a hose or pipe having a hollow bore through which flowable material may flow.

In other embodiments, it is envisaged that the flange may be formed on a pipe section for connection to a hose or pipe, the pipe section defining a hollow bore through which flowable material may flow.

According to another embodiment of the invention, there is provided a flange assembly including a flange in the form of a disk-shaped rim for connection to a hose or pipe, the flange defining a contact face for engagement, in use, with a contact face of an opposed flange, and at least three guide members circumferentially spaced around the contact face of the flange, each guide member being detachably secured to an outer edge of the flange so as to extend generally perpendicularly relative to the contact face of the flange, and reducing in width so as to define a tapered nose section spaced from the contact face of the flange.

BRIEF DESCRIPTION OF THE DRAWINGS

The disclosure will become more fully understood from the following detailed description, taken in conjunction with the accompanying figures, in which.

DETAILED DESCRIPTION

Figure 1:
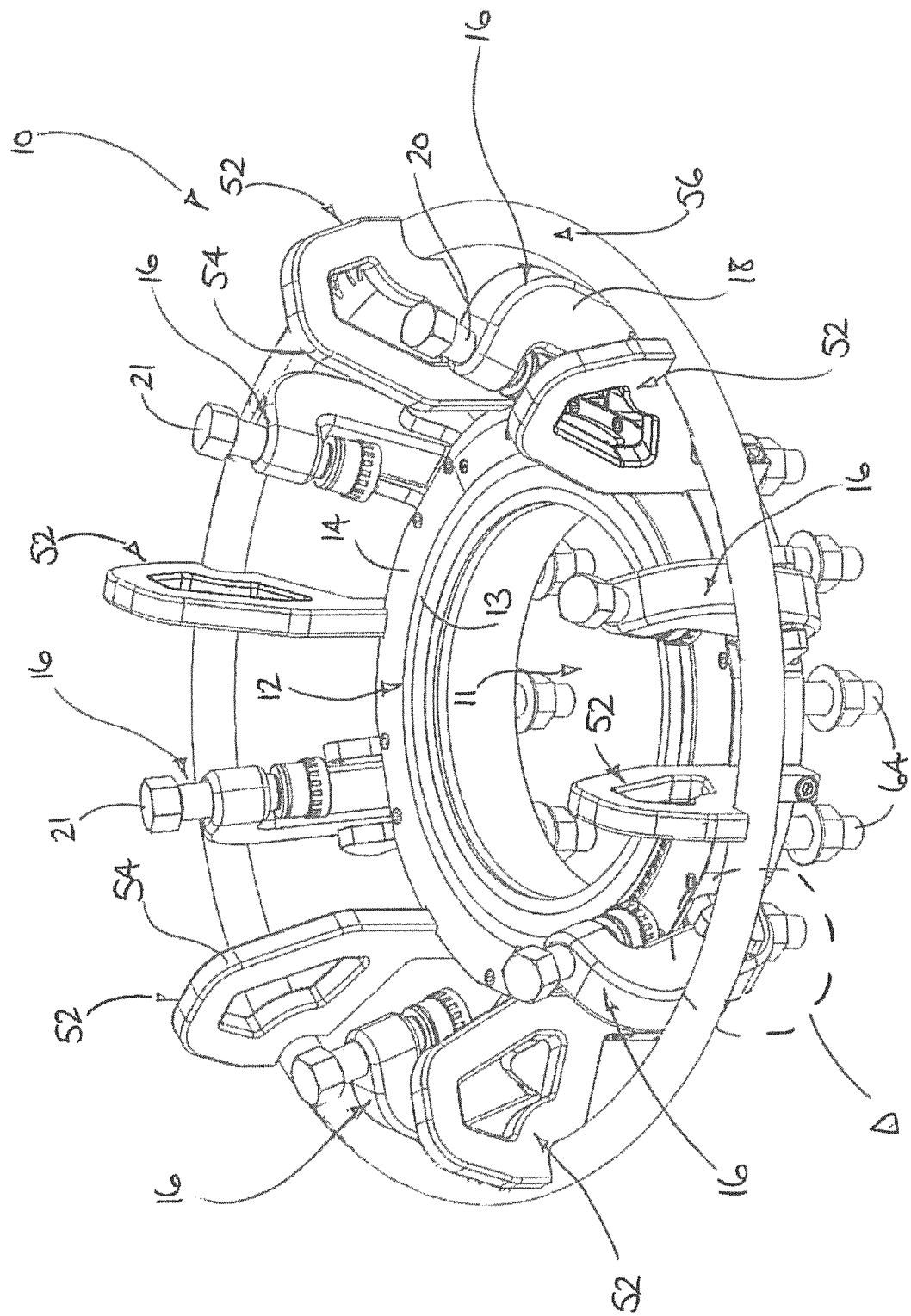
FIG. 1 shows a perspective view of a flange assembly according to an exemplary embodiment of the invention.

A flange assembly 10 according to an exemplary embodiment is shown in FIG. 1.

The flange assembly 10 includes a flange 12 in the form of a disk-shaped rim for connection to a hose or pipe (not shown). The flange 12 defines a contact face 14 for engagement, in use, with a contact face of an opposed flange (not shown).

The flange 12 also defined a gasket seat about a central bore 11 (FIG. 2) to receive, in use, a gasket 13 and the flange assembly 10 further includes first and second opposing gasket clamp members 13a, 13b mounted on the contact face 14 of the flange 12 located on opposite sides of the opening of the bore 11 to releasably retain the gasket 13 in position on the gasket seat. The first gasket clamp 13a is fixed relative to the contact face 14 of the flange 12 whilst the second gasket clamp 13b relative to the contact face 14 of the contact face 14 of the flange 12, towards and away from the gasket seat and the opening of the bore 11. A more detailed description of the operation of the gasket clamp members 13a, 13b is provided in UK Patent No. 2,496,872 B.

The flange assembly 10 also includes six clamps 16 spaced circumferentially around the contact face 14 of the flange 12. Each clamp 16 includes a clamp body 18 pivotably secured to the flange 12 and a clamp member 20 mounted on the clamp body 18 for movement relative thereto.

Figure 2:
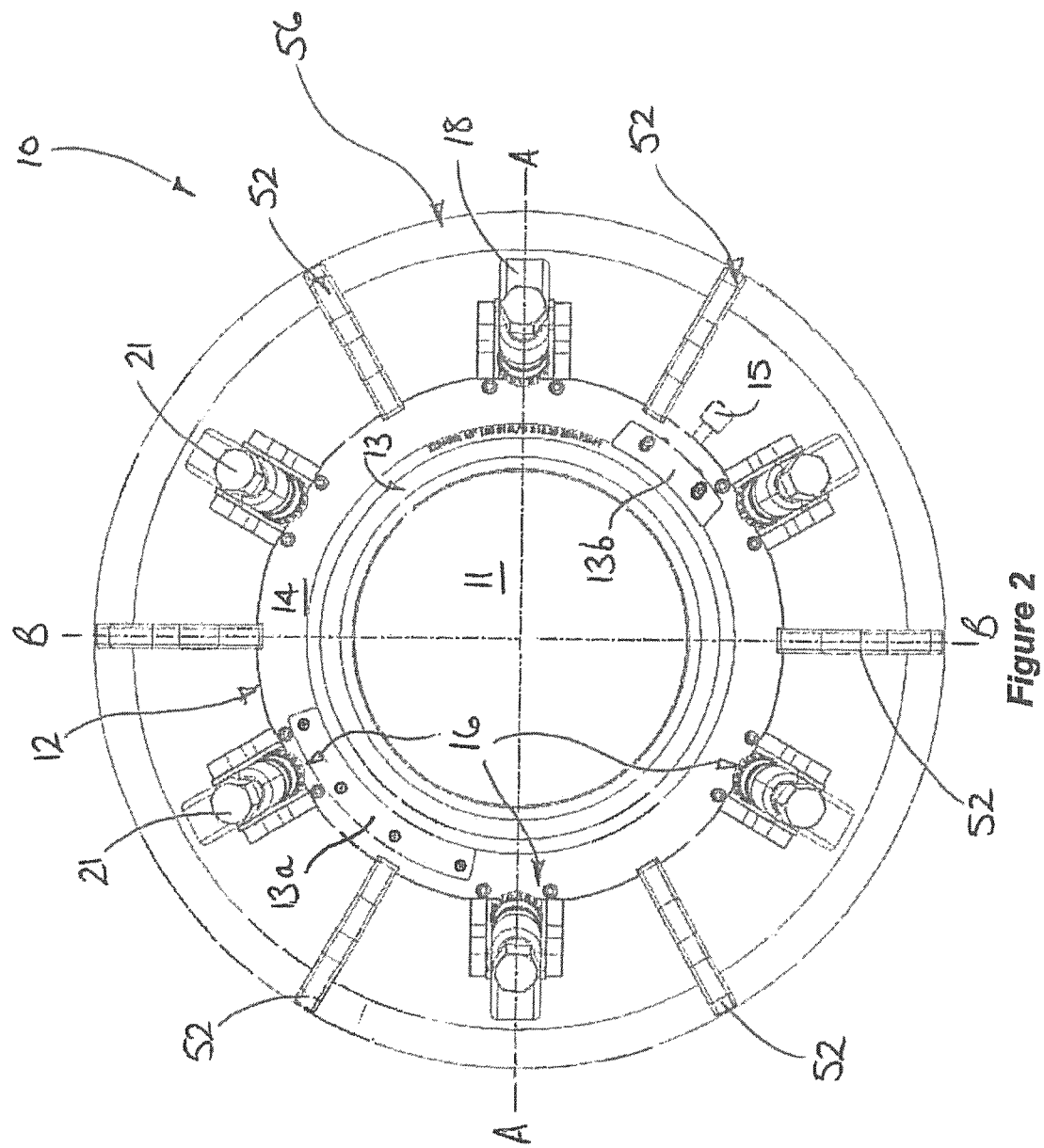
FIG. 2 shows a plan view from above of the flange assembly shown in FIG. 1.
Figure 3:
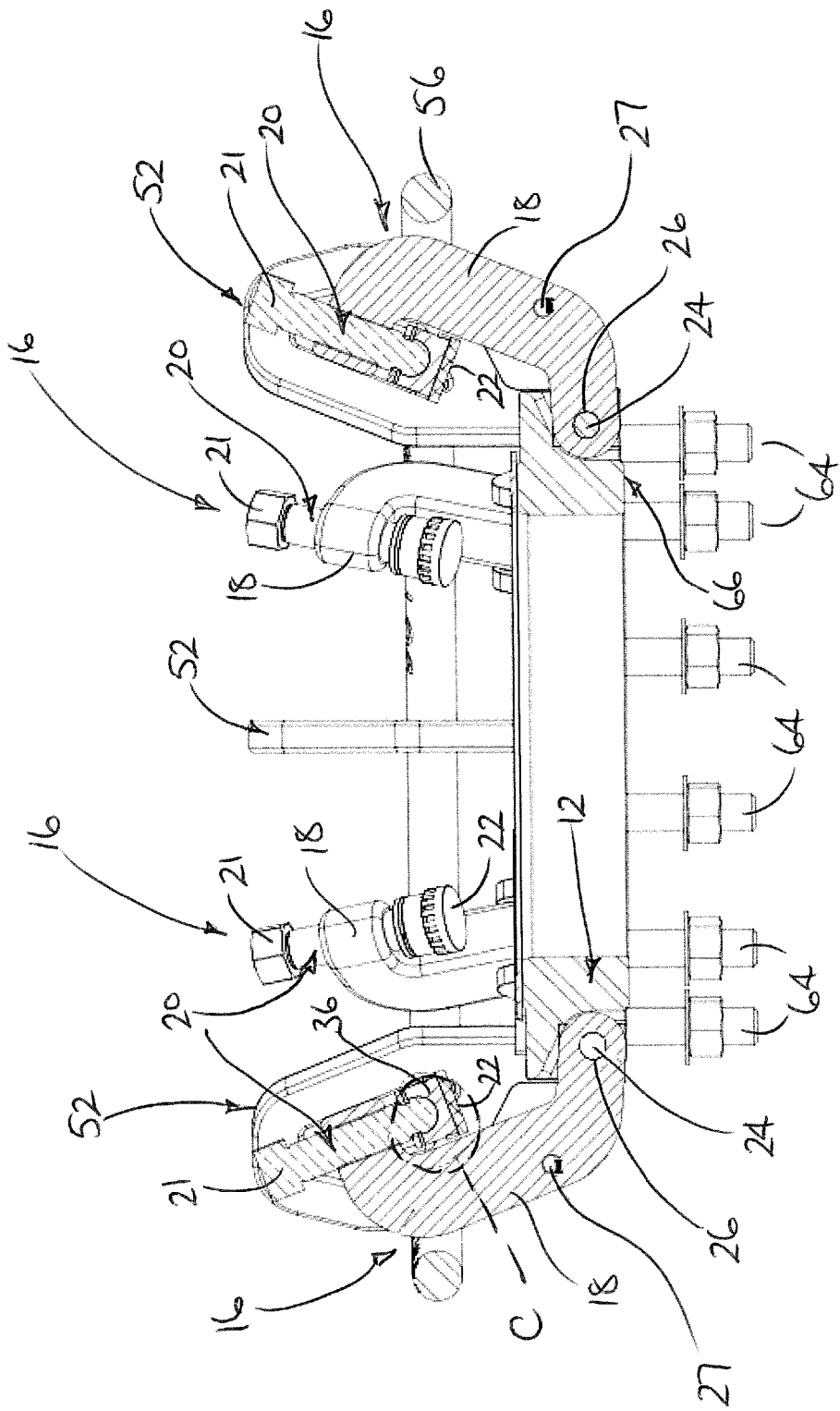
FIG. 3 shows a cross-sectional view of the flange assembly shown in FIG. 2 along section line A-A.

The clamp body 18 of each clamp 16 is shown in FIGS. 1, 2 and 3 in a first, retracted position in which neither the clamp body 18 nor the clamp member 20 obscures or otherwise blocks the contact face 14 of the flange 12. This allows location and engagement, in use, of an opposing flange with the contact face 14 of the flange 12.

Once an opposed flange is properly located and engaged with the contact face 14 of the flange 12, the clamp body 18 is movable from the first, retracted position (shown in FIG. 1) to a second, clamping position (not shown) in which a clamp face 22 (FIG. 3) of the clamp member 20 faces the contact face 14 of the flange 12.

In the embodiment shown in FIG. 1, the clamp member 20 is screw threadedly engaged through an aperture in the clamp body 18. This arrangement allows adjustment of the position of the clamp face 22 relative to the contact face 14 of the flange 12 on rotation of the clamp member 20—the screw threaded engagement between the clamp member 20 and the aperture through the clamp body 18 translating rotational movement of the clamp member 20 into lateral movement of the clamp member 20 relative to the clamp body 18.

Movement of the clamp face 22 of each clamp 16 relative to the contact face 14 of the flange 12 facilitates the adjustment of the clamping force created between the clamp face 22 of each clamp 16 and the contact face 14 of the flange 12 to retain the opposing flange in face to face engagement with the contact face 14 of the flange 12.

In the embodiment shown in FIG. 1, the clamp member 20 includes a hexagonal head 21. This allows adjustment to be effected through the use of conventional spanners and/or sockets.

It will be appreciated that in other embodiments movement of the clamp member 20 of each clamp 16 relative to the respective clamp body 18 may be effected through use of other mechanisms. In other embodiments, for example, a ratchet mechanism may be used to effect movement of each clamp member 20 relative to the respective clamp body 18.

Figure 4:
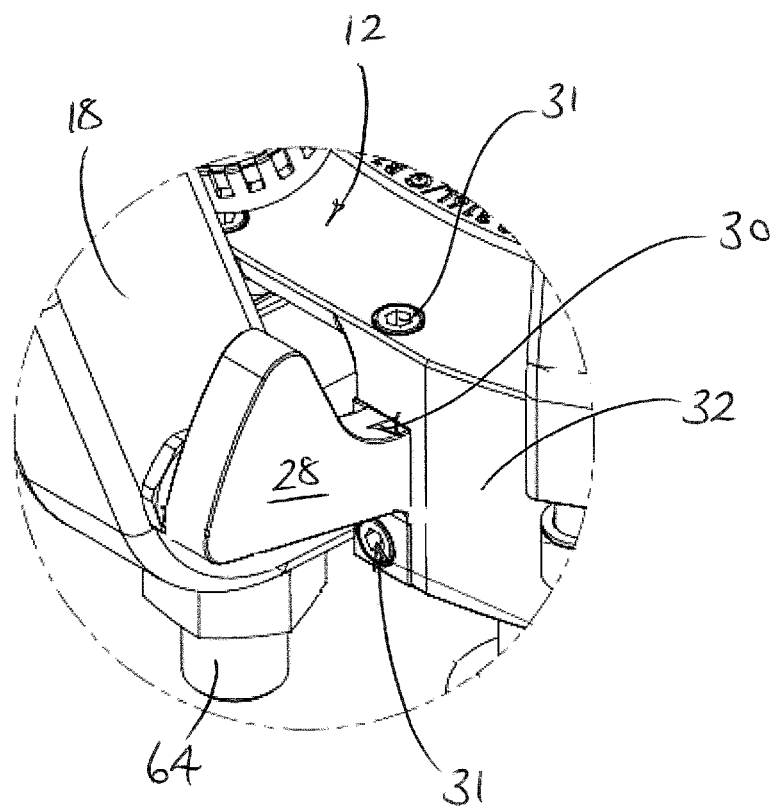
FIG. 4 shows an enlarged view of part D of FIG. 1.

Referring to FIGS. 3 and 4, it can be seen that the clamp body 18 of each clamp 16 is pivotably mounted by means of a pivot pin 24 (FIG. 3) extending through an aperture 26 in the clamp body 18. The pivot pin 24 is received at each end in a pivot block 28 (FIG. 4) such that the clamp body 18 is pivotably mounted between a pair of opposed pivot blocks 28. The pivot blocks 28 are, in turn, secured within an aperture 30 formed within the circumferential edge 32 of the flange 12 by means of screws 31.

The clamp body 18 of each clamp 16 is retained in its first, retracted position, by means of a latching mechanism. The latching mechanism includes a ball catch (19 FIG. 5) on each of two opposing outer surfaces 23 of each clamp body 18. Each ball catch 19 includes a spherical latch element 25 held captive in an aperture 27 formed in the respective outer surface 23 of the clamp body 18 and biased by means of a spring 29 to protrude from the outer surface 23. The protruding latch element 25 engages in a first, correspondingly shaped opening 34 formed in an adjacent, inner surface 35 a respective pivot block 28 when the clamp body 18 is located in the first, retracted position. The protruding latch element 25 also engages in a second, correspondingly shaped opening (not shown) formed in the adjacent, inner surface 35 of the pivot block 28 when the clamp body 18 is located in the second, clamping position.

Figure 5:
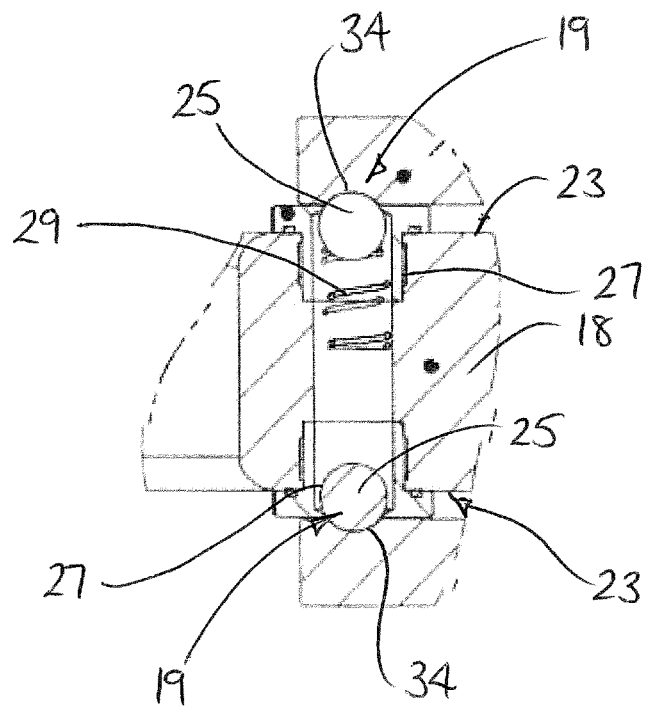
FIG. 5 shows a cross-sectional view through a clamp body and adjacent pivot block of a clamp forming part of the flange assembly shown in FIG. 1.

In the embodiment shown in FIG. 5, the opening 34 in the inner surface of the adjacent pivot block 18 is formed as a dimple or depression.

In order to move the clamp body 18 from the first, retracted position to the second, clamping position, and vice versa, a sufficient force must be applied to the clamp body in order to force the edge of each opening 34 against the respective spherical latch element 25 and cause depression of the spherical latch element 25 against the spring bias—in order to allow the spherical latch element 25 to be disengaged from the opening 34 and allow movement of the clamp body 18. It will be appreciated that the size of the force required to depress each spherical latch element 25 is determined by the size of the bias against which the spherical latch element 25 must be depressed. This can be achieved through the use of a stiffer spring in order to increase the size of the force required or a softer spring in order to reduce the size of the force required.

Figure 6:
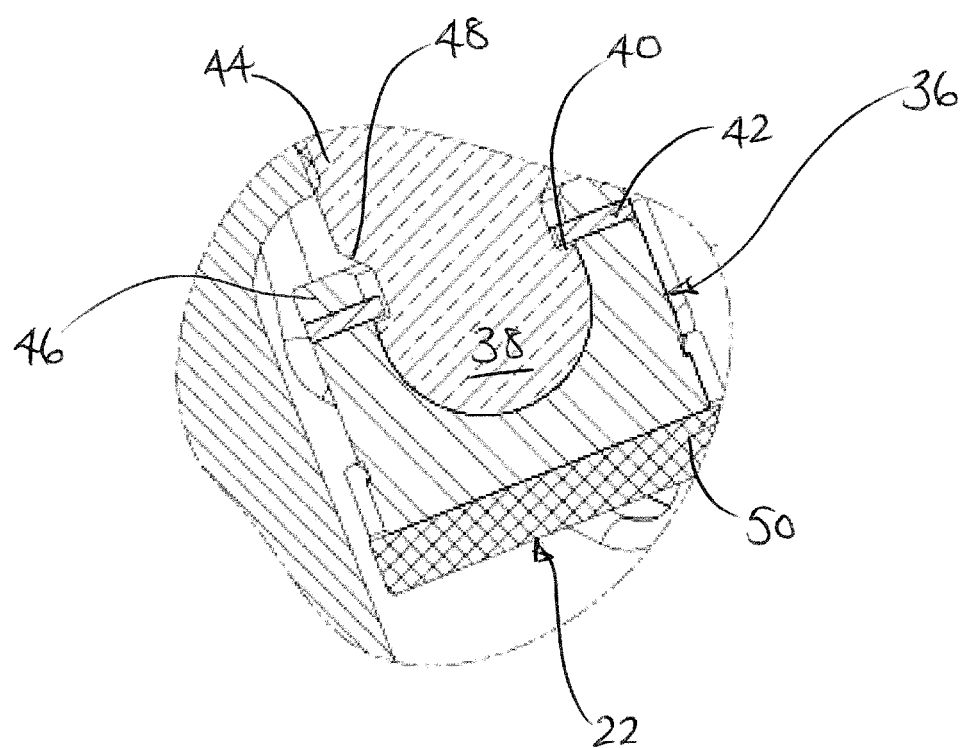
FIG. 6 shows an enlarged view of part C of FIG. 3.

The clamp member 20 of each clamp 16 includes a foot element 36 (FIGS. 3 and 6) mounted at an end thereof by means of a ball joint 38. The ball joint 38 defines a first shoulder 40 over which a retention clip 42 is engaged to retain the foot element 36 in position on the end of a leg element 44 of the clamp member 20. The foot element 36 defines the clamp face 22 of the clamp member 20 and is formed from a compressible material.

The use of a ball joint 38 to mount the foot element 36 to the end of the leg member 44 allows rotation of the foot element 36 relative to the leg 44. Such flexure allows the clamp face 22 to turn on the ball join 38 on engagement against a rear surface of an opposing flange in order to maximise contact between the clamp face 22 and the rear surface of the opposing flange.

The use of a compressible material to form the foot element 36 allows compression of an engagement portion 46 located between the retention clip 42 and a second shoulder 48 on the leg element 42. This compression limits and controls the degree of flexure of the foot element 36 relative to the leg member 44.

In the embodiment shown in FIG. 1, the clamp face 22 on the foot element 36 of each clamp 16 includes an insulating pad 50. This is particularly advantageous for use in cryogenic applications. In such applications, cryogenic material flowing through the pipes and/or hoses causes cooling of the flanges.

The provision of an insulating pad 50 on the foot element 36 of each the clamp 16 reduces or prevents the flow of heat energy from the clamp member 20 to the rear surface of the opposing flange and thus prevents or at least reduces the cooling of the clamping members 20 that might otherwise injure an operator during adjustment of the position of the clamp face 22 relative to the contact face 14.

So as to assist location of an opposing flange and engagement of the opposing flange with the contact face 14 of the flange 12, the flange assembly 10 includes six guide members 52 spaced around the contact face 14 of the flange 12.

Each guide member 52 is detachably secured to the circumferential edge 32 of the flange 12 by means of two screws 55 and extends generally perpendicularly relative to the contact face 14 of the flange 12. An uppermost end of each guide member 52 reduces in width so as to define a tapered nose section 54.

In use, the guide members 52 serve to guide the flange 12 and an opposing flange into alignment readily with minimum input from an operator and thereby reducing the risk of injury.

In order to further protect the flange assembly 10 during alignment of the flange 12 with an opposing flange, a protection ring 56 extends around and is detachably secured to outer edges 58 of the guide members 52 by means of screws 60.

The protection ring 56 protects the guide members 52 and the clamps 16 during alignment of opposing ends of two pipes. It will be appreciated that such pipes may be significant in size and weight, hence the desire to minimise the risk of damage caused by collisions between component parts and damage caused by trapping hands or fingers therebetween.

The use of guide members 52 and a protection ring 56 that are detachably secured, allows for different arrangements and configurations depending on the flange. It thus provides a reconfigurable flange assembly for use with a range of flanges. It is envisaged that the flange assembly could be used with any existing flange or pipe arrangement and the flange member, for example, may be provided in the form of a spool flange, a slip on flange, a weld neck flange or a studded flange.

In the arrangement shown in FIG. 1, the clamps 16 and guide members 52 are alternately arranged and equidistantly spaced, circumferentially, around the contact face 14 of the flange 12.

It will be appreciated that, in other embodiments, different numbers of clamps 16 and guide members 52 may be employed.

It will also be appreciated that in other embodiments, depending on the intended application of the flange assembly, the guide members 52 may be omitted or the clamps 16 may be omitted. In embodiments where the clamps 16 are omitted, it is envisaged that different clamps, through bolts or other fixing elements would be employed to secure and maintain engagement of the opposing flange and flange 12 in face to face contact.

Figure 7:
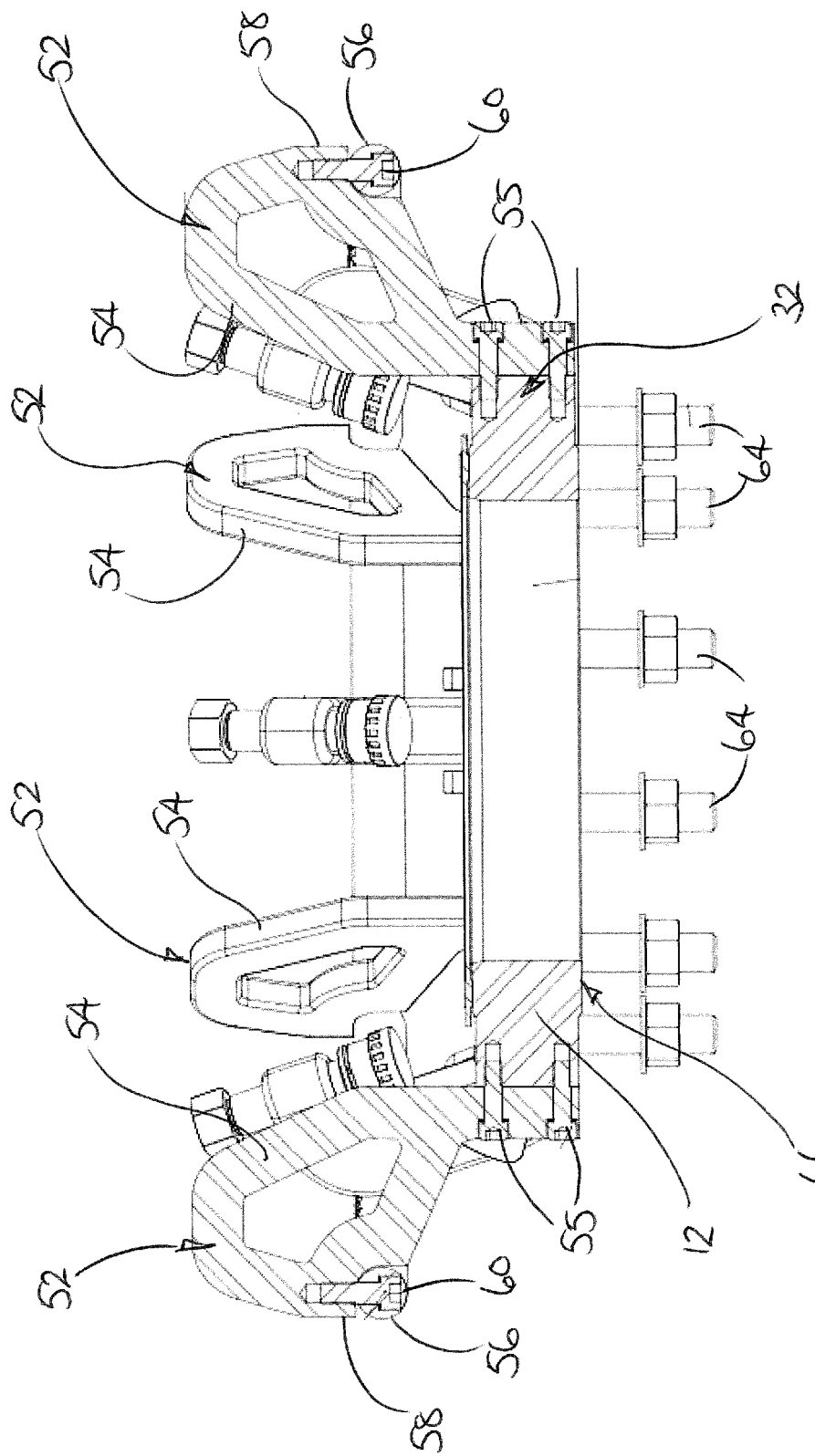
FIG. 7 shows a cross-sectional view of the flange assembly shown in FIG. 2 along section line B-B.

The flange assembly 10 forms part of a modular arrangement. In order to couple the flange 12 to a pipe or hose section 62 (FIG. 7), the flange assembly 10 includes a plurality of connecting bolts 64 protruding from a rear surface 66 of the flange 12. The connecting bolts 64 are equidistantly spaced about the circumference of the flange 12 and are engageable within apertures 68 formed in a pipe or hose section 62.

Figure 8:
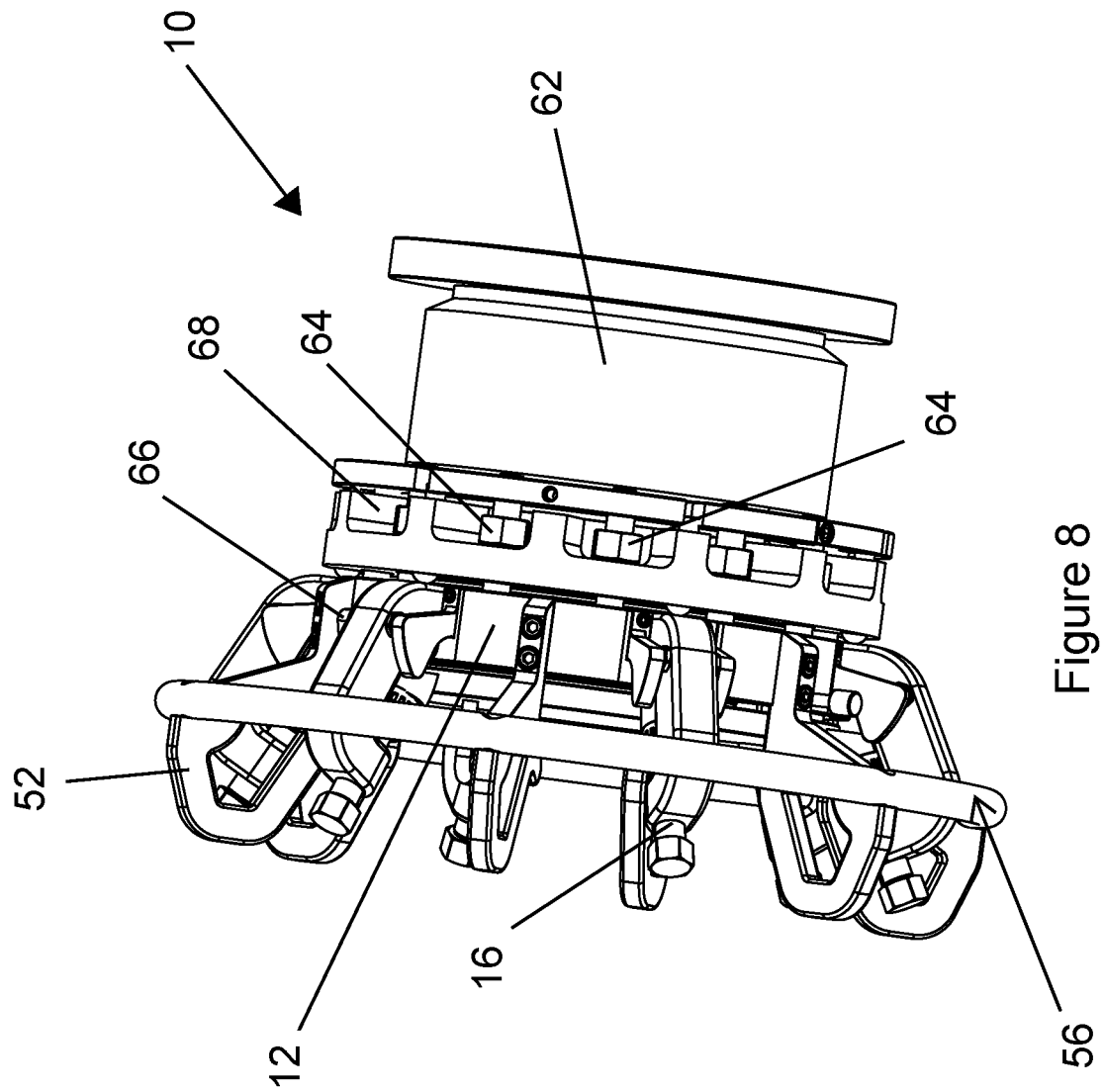
FIG. 8 shows the flange assembly of FIG. 1 coupled to a pipe section.
Figure 9:
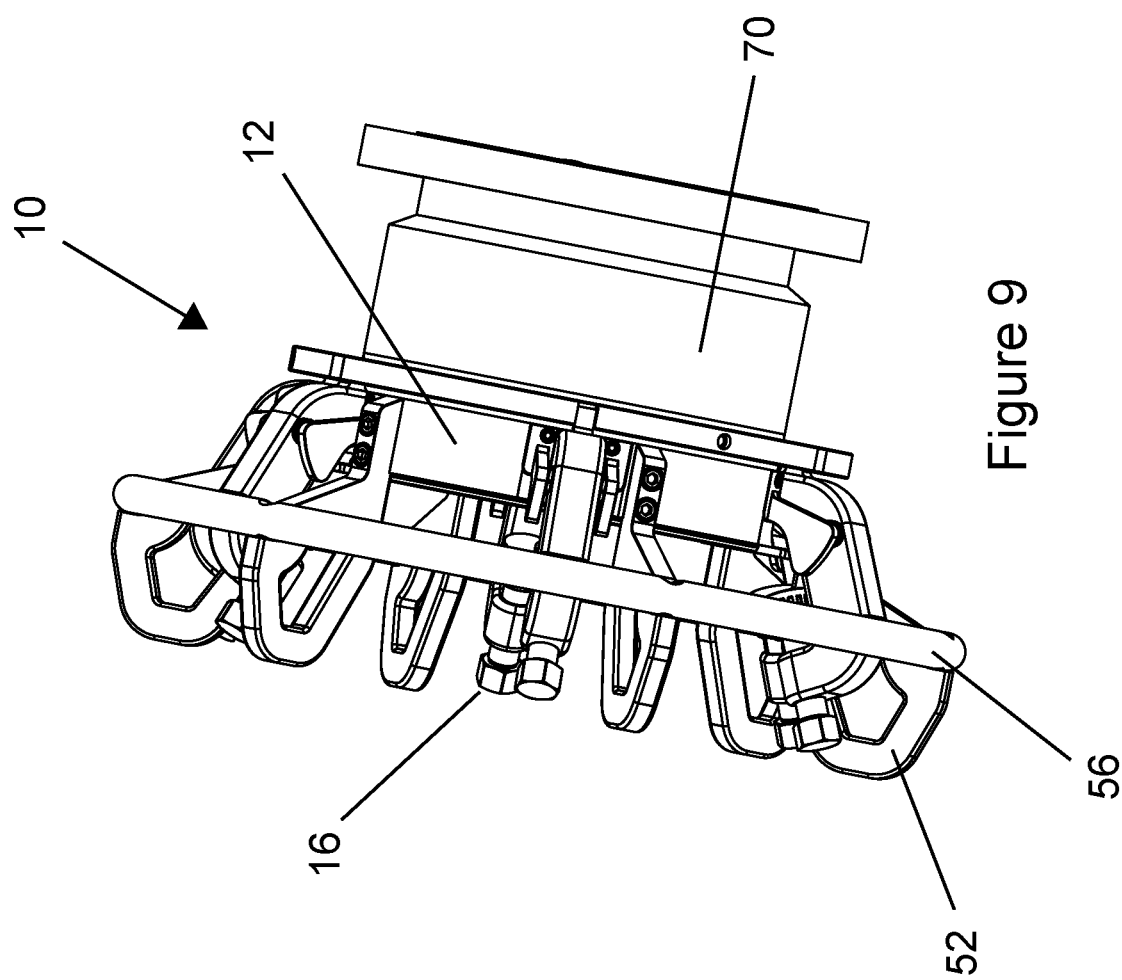
FIG. 9 shows a flange assembly according to another embodiment of the invention.

In other embodiments, such as that shown in FIGS. 8 and 9, it is envisaged that the flange 12 might be formed on a pipe section 70 for connection to a hose or pipe.

What is claimed is:

1. A flange assembly, comprising:
   a flange in the form of a disk-shaped rim for connection to a hose or pipe, the flange defining a contact face for engagement in use with a contact face of an opposed flange; and
   at least three clamps spaced circumferentially around the contact face of the flange, each clamp including a clamp body pivotably secured to the flange and a clamp member mounted on the clamp body for movement relative thereto, the clamp body being movable between a first, retracted position and a second, clamping position in which a clamp face of the clamp member faces the contact face of the flange, the clamp member being movable relative to the clamp body to adjust the position of the clamp face relative to the contact face of the flange and thereby adjust a clamping force created between the clamp face and the contact face of the flange to retain, in use, an opposing flange in face to face engagement with the contact face of the flange, wherein the clamp member of each clamp includes a leg having a foot element mounted at an end thereof by means of a ball joint, the foot element defining the clamp face of the clamp member.

2. The flange assembly of claim 1, wherein the clamp member is threadedly engaged through an aperture in the clamp body, the clamp face being movable relative to the contact face of the flange, when the clamp body is located in the second, clamping position, on rotation of the clamp member.

3. The flange assembly of claim 1, wherein each clamp includes a latching mechanism that is operable to hold the clamp body and prevent free movement thereof when the clamp body is located in the first, retracted position.

4. The flange assembly of claim 3, wherein the clamp body of each clamp is pivotably mounted between a pair of opposed pivot blocks, the pivot blocks being secured to an outer circumferential edge of the flange.

5. The flange assembly of claim 4, wherein each clamp body includes a ball catch on outer surfaces thereof, each ball catch including a spherical latch element captive within an aperture formed in the respective outer surface of the clamp body whilst being biased to protrude from the outer surface of the clamp body, the spherical latch element of each ball catch being engageable in a correspondingly shaped opening formed in an adjacent surface of a respective pivot block when the clamp body is located in the first, retracted position.

6. The flange assembly according to claim 5, wherein the spherical latch element of each ball catch is additionally engageable in a correspondingly shaped opening formed in the adjacent surface of the respective pivot block when the clamp body is located in the second, clamping position.

7. The flange assembly according to claim 3, wherein the latching mechanism is operable to hold the clamp body and prevent free movement thereof when the clamp body is located in each of the first, retracted and second, clamping positions.

8. The flange assembly of claim 1, wherein the foot element is formed from a compressible material to allow flexure of the foot relative to the leg on engagement, in use, of the clamp face against a rear surface of an opposing flange.

9. The flange assembly of claim 1, wherein an insulating pad is provided on the clamp face of each clamp member.

10. The flange assembly of claim 1, further comprising at least three guide members circumferentially spaced around the contact face of the flange, each guide member being detachably secured to an outer edge of the flange so as to extend generally perpendicularly relative to the contact face of the flange, and reducing in width so as to define a tapered nose section spaced from the contact face of the flange.

11. The flange assembly of claim 10, wherein the clamps and guide members are alternately arranged and equidistantly spaced, circumferentially, around the contact face of the flange.

12. A flange assembly, comprising:
   a flange in the form of a disk-shaped rim for connection to a hose or pipe, the flange defining a contact face for engagement, in use, with a contact face of an opposed flange; and
   at least three guide members circumferentially spaced around the contact face of the flange, each guide member being detachably secured to an outer edge of the flange so as to extend generally perpendicularly relative to the contact face of the flange, and reducing in width so as to define a tapered nose section spaced from the contact face of the flange,
   wherein the flange assembly further comprises a plurality of connecting bolts protruding from a face of the flange opposite the contact face in order to connect the flange, in use, to a hose or pipe having a hollow bore through which flowable material may flow.

13. The flange assembly of claim 12, further comprising a protection ring extending around and detachably secured to outer edges of the guide members.

14. The flange assembly of claim 12, wherein the flange is formed on a pipe section for connection to a hose or pipe, the pipe section defining a hollow bore through which flowable material may flow.

* * * * *